March 6, 1945.　　　　O. H. BASQUIN　　　　2,371,121
LOCKING DEVICE
Filed Jan. 23, 1942
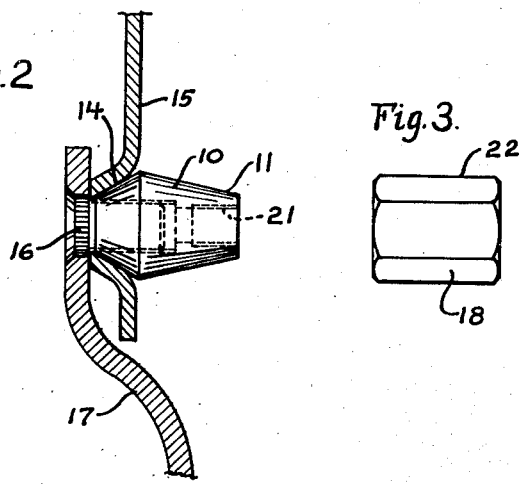
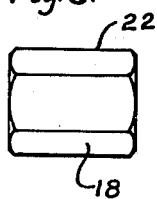
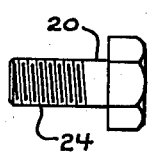
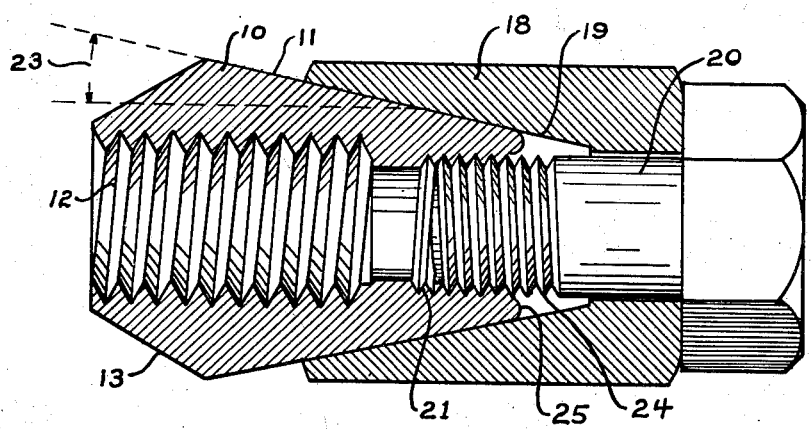
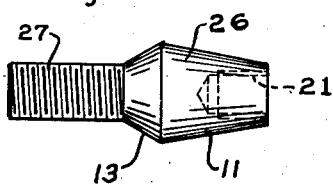
Inventor
Olin H. Basquin.
By Roland C. Rehm
Attorney.

Patented Mar. 6, 1945

2,371,121

UNITED STATES PATENT OFFICE 2,371,121

LOCKING DEVICE

Olin H. Basquin, Evanston, Ill., assignor to Streeter-Amet Company, Chicago, Ill., a corporation of Illinois Application January 23, 1942, Serial No. 427,931

7 Claims. (Cl. 85—32)

This invention relates to locking devices and among other objects aims to provide an inexpensive locking device suitable to lock wheels and tires on vehicles.

The nature of the invention may be readily understood by reference to one illustrative device embodying the invention and shown in the accompanying drawing.

In said drawing:

Figure 1 is a longitudinal section on a considerably enlarged scale of the locking device including the "key" means for applying and removing the same.

Figure 2 is a radial section through a portion of a vehicle wheel and hub showing one of the locking elements operating to lock a vehicle wheel on the hub.

Figure 3 is an elevation of one element of the "key" for applying and unlocking the locking element.

Figure 4 is the other element of the "key"; and

Figure 5 is a view of a different form of locking element employed where bolts instead of mere nuts are employed.

Locking devices heretofore available are not suitable for rotating elements such as vehicle wheels, since they unbalance the wheels. In the ordinary automobile each wheel is held on by five equally spaced nuts or bolts. The ordinary lock placed over or substituted for one nut would seriously unbalance the wheel and this could not be corrected by counter-balancing with an oppositely located lock since no nut is diametrically opposite any other. Moreover, such locks can easily be broken by a blow with a hammer and their cost is almost prohibitive.

The illustrative locking device is inexpensive and particularly adapted for locking vehicle wheels or other rotating objects since its weight is not substantially greater than the conventional nut or bolt which, in this instance, it replaces, but its use is not limited to vehicle wheels or, indeed, to rotating objects where balance is a consideration.

The illustrative locking element 10 represents a lock element which is rotatable in its locking and unlocking movement. It is characterized by a conical exterior surface 11 of circular section which cannot be gripped by a Stillson or other wrench. In this case it replaces a wheel nut and is internally threaded as at 12 with threads of the diameter and pitch corresponding to that of the bolt or stud on which it is to be screwed. The threads or other means of attachment depend upon the character of the unit with which the locking element is used. In the present case it has both a fastening and locking function. The base of the element is here shown provided with a cone seat 13 corresponding with the cone seat on the conventional nut and designed to bear against and center the conical opening 14 of the wheel 15 with the stud 16 on the wheel hub 17.

To apply or remove the locking element, a key element 18 having an internal conical surface 19 exactly corresponding to or complementary with that of the conical surface 11 is placed over the latter and forced into frictional gripping relation therewith by means here shown in the form of a "key" bolt 20 which screws into the threads 21 inside the outer end of the element 10. The exterior surface 22 of the key element 18 is non-circular, e. g., hexagonal or square in shape to receive a wrench. Preferably the conformation of the exterior of the locking element corresponds to that of the nut replaced by the locking element 10 so that the same socket wrench as used for applying and removing the conventional nuts may be used on the key element 18. To develop a satisfactory frictional engagement of the key element with the conical surface of the locking element 10, the bolt 20 is screwed in tightly. Then the locking element 10 may be applied or removed in the same manner as the ordinary nut or bolt.

To endow the key element 18 and bolt 20 with the principles of a key, the taper 23 of the conical surface 11 and the corresponding internal taper 19 of the key element 18 are varied for different nuts. A difference of as much as a degree in the taper of the surface 11 and the internal taper 19 of the key element is sufficient to prevent adequate frictional contact between the surfaces 11 and 19 to remove the locking element 10. In other words, in order to remove the latter one must first be in possession of a key element 18 which has the exact taper of that of the locking element 10, and even if one were supplied with a complete set of all types of key elements, it would be extremely difficult to determine simply by hand fitting, the proper key element for a given exterior conical surface. In addition, the threads 24 of the key bolt 20 and the corresponding internal threads 21 in the locking element 10 must match exactly. These may be varied both as to diameter, pitch, and character of thread. Therefore, to attach the proper key element 18 one must be in possession of a key bolt 20 which exactly fits the threads 21 in the locking element 10. These threads may be either the conventional V-thread, square thread, acme thread, buttress thread, and other special or non-standard form of threads. The variation possible is almost infinite. Even if one were in possession of a complete set of all the varied key bolts manufactured, it would be exceedingly difficult to select the proper bolt. The time required to find the proper key elements and bolt would be more than ample deterrent to the thief. Preferably the key elements 18 and 20 should be given code numbers or symbols which will identify the particular taper, thread, etc., which could be recorded by the owner to permit replacement.

Once the locking element is applied, the key bolt 20 and key element 18 are removed. Both the key bolt and key element are kept as one would keep a key since, in fact, together they constitute a key. To remove the locking element 10 one must be in possession both of a key element 18 having the particular taper and a key bolt 20 having the particular thread of the locking element 10.

The outer rim or end 25 of the locking element 10 is preferably rounded so as to make it impossible to obtain sufficient frictional contact between a nut clamped to the end of the locking element and the locking element itself to unscrew the latter.

In Figure 5 is shown a locking element 26 provided with a bolt stud 27 for use in those cases where the wheel or other element is fastened by a bolt instead of a nut. In other respect it is similar to the locking element 10.

The weight of the locking element is not substantially greater than that of the nut or bolt which it replaces and, therefore, only one need be used for each wheel or other rotating element, since the balance is not materially affected.

Obviously, the invention is not limited to the details of the illustrative locking device since these may be variously modified. Moreover, it is not indispensable that all features of the invention be used conjointly since various features may be used to advantage in different combinations and sub-combinations.

Having described my invention, I claim:

1. A locking device comprising, in combination, a locking element rotatable for locking and unlocking movements, the exterior of said locking element having a hardened conical surface incapable of being gripped by a wrench, a key element having a non-circular exterior adapted to be gripped by a wrench or the like and having on its interior a conical surface, and means for forcing said key member over the exterior conical surface of said locking member into tight engagement therewith, said key member developing a frictional engagement with said exterior conical surface only when the pitch of its interior conical surface is identical with that of said exterior conical surface.

2. A locking device comprising, in combination, a locking element rotatable for locking and unlocking movements, the exterior of said locking element having a hardened conical surface incapable of being gripped by a wrench, a key element having a non-circular exterior adapted to be gripped by a wrench or the like and having on its interior a conical surface, said locking member being internally threaded adjacent its outer end, and a bolt adapted to pass through said key member and thread into said locking member to force said key member tightly against said locking member, said key member developing a frictional engagement with said exterior conical surface only when the pitch of its interior conical surface is identical with that of said exterior conical surface.

3. A locking device comprising, in combination, a locking element rotatable for locking and unlocking movements, the exterior of said locking element having a hardened conical surface incapable of being gripped by a wrench and being internally threaded adjacent its outer end, said locking member being adapted to be rotated by a key member having an internal conical surface corresponding identically with the pitch of said exterior hardened surface when the key member is forced into gripping engagement with said exterior hardened surface by a bolt having threads exactly corresponding with the internal threads in said locking member.

4. A method of preventing unauthorized unlocking of a lock having a rotatable locking member which comprises forming the exterior of the rotatable locking member with a hardened conical surface incapable of being gripped by a wrench or the like, and rotating the locking member by means of a key member having a non-circular exterior and a conical interior and forcing the key member into frictional engagement with the locking member by means of a bolt whose threads correspond identically with the threads on the interior of the locking member, frictional engagement being developed only when the pitch of the interior conical surface is identical with that of the exterior conical surface.

5. A locking device comprising in combination a locking member having a conical head whose surface is of such hardness as to be incapable of being gripped by a wrench or the like, a removable key element therefor having an internal conical surface exactly complementary to the conical surface on said locking member and adapted to engage the latter with sufficient frictional contact to operate it in its locking and unlocking movements, and means for forcing said key element into operating frictional contact with the conical surface on said locking member, said means being releasable to permit removal of said key element after movement of said locking member to locking position.

6. A locking device unlocked by rotation having a conical exterior surface of circular section and of such hardness as to be incapable of being gripped by a wrench or the like, said conical surface being a friction surface adapted to be frictionally engaged by a removable exterior key member, said locking device having means for connecting the locking device with the element to be locked and further having means on its interior receiving and cooperating with a member for forcing the key member into such firm frictional contact with said conical surface as to enable the locking device to be rotated by the key member to unlock the locking device.

7. A locking device for automobile wheels and the like which comprises a securing part having a head and screw threads permitting it to be screwed into engagement with a member to be held in place, the central portion of the head being entirely circular in cross-section and the end sloped to eliminate projections which may be engaged by an ordinary tool, an operative part shaped to be engaged by an ordinary tool and having a seat arranged to engage the sloped end on the head, and screw means for removably coupling the securing and operative parts together.

OLIN H. BASQUIN.